US012738754B2

(12) United States Patent
Ran et al.

(10) Patent No.: US 12,738,754 B2
(45) Date of Patent: Sep. 15, 2026

(54) CHARGER CONTAINER

(71) Applicant: The Stanley Works Israel Ltd., Rosh Ha'Ayin (IL)

(72) Inventors: Amit Ran, Mazkeret Batya (IL); Gilad Moisa, Hod HaSharon (IL); Amit Rotenberg, Kiryat Ono (IL); Gal Avigad, Gonen (IL)

(73) Assignee: The Stanley Works Israel Ltd., Rosh Ha'Ayin (IL)

( * ) Notice: Subject to any disclaimer, the term of this patent is extended or adjusted under 35 U.S.C. 154(b) by 620 days.

(21) Appl. No.: 17/481,880

(22) Filed: Sep. 22, 2021

(65) Prior Publication Data

US 2022/0094185 A1 Mar. 24, 2022

(30) Foreign Application Priority Data

Sep. 24, 2020 (EP) .................................... 20198035

(51) Int. Cl.
*H02J 7/00* (2006.01)
*B25H 3/02* (2006.01)

(52) U.S. Cl.
CPC .............. *H02J 7/0045* (2013.01); *B25H 3/02* (2013.01); *H02J 7/0013* (2013.01); *H02J 7/0048* (2020.01); *H02J 2310/22* (2020.01)

(58) Field of Classification Search
CPC ..................................................... H02J 7/0045

(Continued)

(56) References Cited

U.S. PATENT DOCUMENTS

2008/0035507 A1 * 2/2008 Collister ................ B25H 3/006 206/349
2011/0005951 A1 * 1/2011 Baumgartner ......... B25H 3/006 165/59

(Continued)

FOREIGN PATENT DOCUMENTS

CN 201471421 U * 5/2010 ............... B25H 3/02
CN 102814801 A 12/2012

(Continued)

OTHER PUBLICATIONS

Battery Charging Case (Year: 2011).*
Extended European Search Report dated Nov. 3, 2020 in corresponding EP application No. 20198035.6, 35 pages.

*Primary Examiner* — Jerry D Robbins
(74) *Attorney, Agent, or Firm* — Michael Aronoff

(57) ABSTRACT

A container for storing tools and charging batteries includes a containment volume bounded by a base and a plurality of side walls. The container includes a cover moveable between a first position coupled to each of the side walls remote from the base and a second position remote from one or more of the side walls. In the first position, the cover, side walls and base form a closed container bounding the containment volume within which the tools and batteries may be stored, and in the second position, the cover does not close the containment volume, so that tools and charging batteries stored therein are accessible. The cover has a first side which includes a first electrical charging element for charging tool batteries and a second side which includes visual indicia for displaying the state of charge of tool batteries when electrically connected to the first electrical charging element.

6 Claims, 5 Drawing Sheets

(58) Field of Classification Search
USPC .......................................................... 320/107
See application file for complete search history.

(56) References Cited

U.S. PATENT DOCUMENTS

| | | | | |
|---|---|---|---|---|
| 2012/0312708 | A1* | 12/2012 | Roehm | F21V 33/0084 206/349 |
| 2014/0327396 | A1* | 11/2014 | Rejman | B25H 3/006 320/108 |
| 2015/0002089 | A1* | 1/2015 | Rejman | H02J 7/0044 320/108 |
| 2015/0094123 | A1* | 4/2015 | Yeiser, IV | A45D 40/24 340/636.2 |
| 2017/0063114 | A1* | 3/2017 | Briere | H02J 7/0013 |
| 2017/0165828 | A1* | 6/2017 | Fleischmann | B65D 85/00 |
| 2019/0393706 | A1 | 12/2019 | Huggins | |
| 2021/0305824 | A1 | 9/2021 | Shirazi et al. | |
| 2022/0102995 | A1* | 3/2022 | Fieldbinder | H02J 7/00036 |

FOREIGN PATENT DOCUMENTS

| | | | | |
|---|---|---|---|---|
| CN | 102848368 | A | 1/2013 | |
| CN | 206211558 | U | 5/2017 | |
| DE | 3515123 | A1 | 7/1986 | |
| DE | 102011007649 | A1 * | 12/2011 | H02J 7/0042 |
| DE | 102012213418 | A1 | 5/2013 | |
| DE | 202017001477 | U1 | 6/2017 | |
| EP | 3271991 | B1 | 5/2019 | |
| EP | 3711904 | A1 | 9/2020 | |
| JP | 2018038118 | A | 3/2018 | |
| WO | 2016146194 | A1 | 9/2016 | |

* cited by examiner

CHARGER CONTAINER

CROSS-REFERENCE TO RELATED APPLICATIONS

This application claims priority, under 35 U.S.C. § 119, to EP Patent Application No. 20198035 filed Sep. 24, 2020.

FIELD OF THE INVENTION

The present invention relates to a container. More particularly, to a container having the capability of transporting and charging electrical items such as batteries/phones while giving a visual indicia of charge level of said electrical item.

BRIEF SUMMARY OF THE INVENTION

Containers or toolboxes used to transport the tools and accessories are well known. Power tools such as drills, saws and grinders are often among the tools that a worker will require at a worksite. Modern power tools are often powered by rechargeable batteries. In order to achieve all of the tasks in a given workday, a work person may require the use of several such rechargeable batteries. Having fully charged batteries when needed is important to maintain a workers efficiency.

In order to meet this need, it would be advantageous to have a container that is not only capable of transporting batteries, but also capable of charging one or more such batteries. Moreover, it would be advantageous if said container would provide a visual indicia of the charge level of the battery. The present invention overcomes one or more of the aforementioned problems.

According to the present invention, there is provided a container for both storing tools and charging tool batteries. The container includes a containment volume bounded by a base and a plurality of side walls, each of the side walls coupled to the base. The container further includes a closable cover member adapted to be moveable between a first position coupled to each of the side walls remote from the base and a second position remote from one or more of the side walls, such that, in the first position, the closable cover member, the side walls and the base form a closed container bounding the containment volume and within which the tools and batteries may be stored and in the second position, the closable cover member does not close the containment volume, so that tools and charging batteries stored therein are accessible past the cover member. The container is characterised in that the cover member has: i) a first side, which first side, when the cover member is in the first position, is inaccessible from outside the container and which first side includes a first electrical charging element for charging tool batteries electrically connected thereto and a ii) second side, remote from the first side, which second side is accessible from outside the container when the cover member is in the first position and which second side includes visual indicia for displaying the state of charge of tool batteries when electrically connected to the first electrical charging element.

BRIEF DESCRIPTION OF THE DRAWINGS

The invention is herein described, by way of example only, with reference to the accompanying drawings, wherein.

DETAILED DESCRIPTION OF THE DRAWINGS

Figure 1:
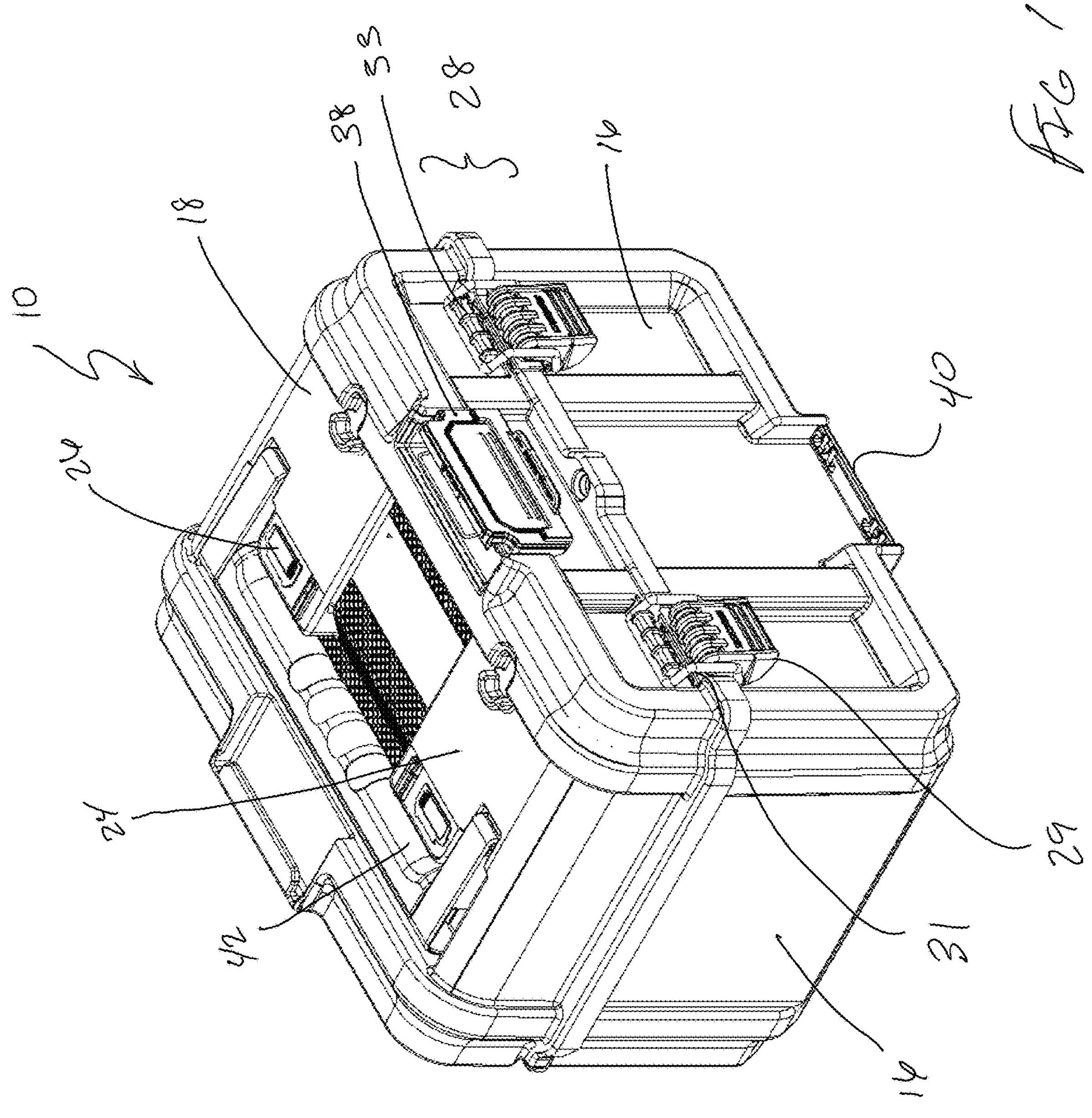
FIG. 1 is a front perspective view of the closed container.

FIG. 1 shows a container 10 in accordance with an embodiment of the present invention. The container 10 is configured for the storage and transportation of tools and rechargeable batteries 23. The container 10 is also configured to charge said rechargeable batteries 23. The container 10 defines a containment volume 12 that is bounded by a base 14 and a plurality of side walls 16. Each side wall 16 is coupled to the base 14. The container 10 also includes a closeable cover member 18. The cover member 18 is adapted to be moveable between a first position and a second position. In said first position, the cover member 18 is coupled to the side walls 16 remote from the base 14 such that it forms a closed container 10 bounding the containment volume 12. When the cover member 18 is in the first position, tools and batteries 23 can be stored in the containment volume 12 and access thereto is limited. In said second position, the cover member 18 does not close the containment volume 12. When the cover member is in the second position, tools and batteries 23 within the containment volume 12 are accessible past the cover member.

Figure 3B:
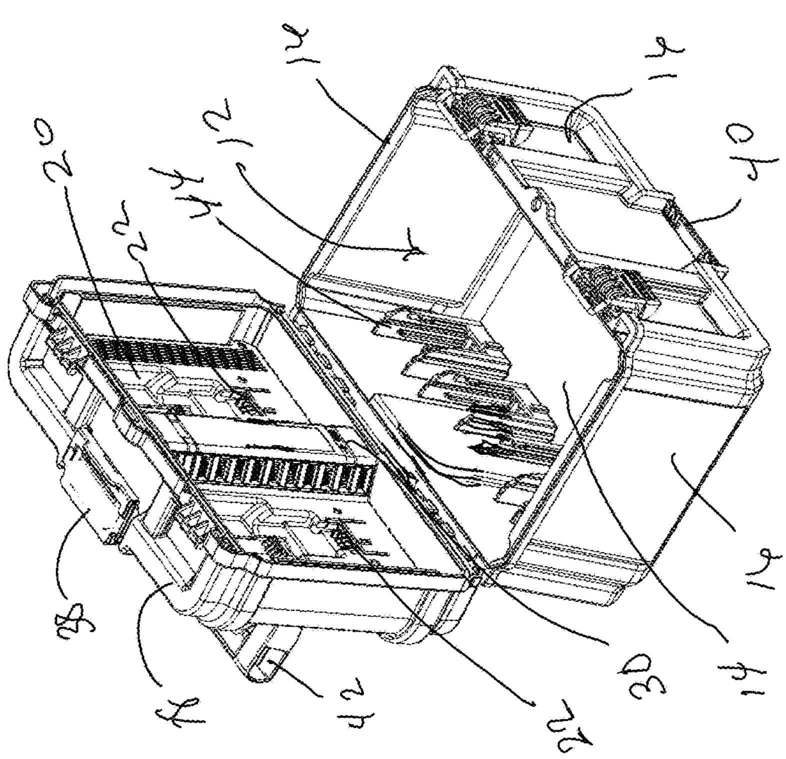
FIGS. 3*a* and 3*b* are front perspective views of the open container respectively showing the container with and without batteries.
Figure 3A:
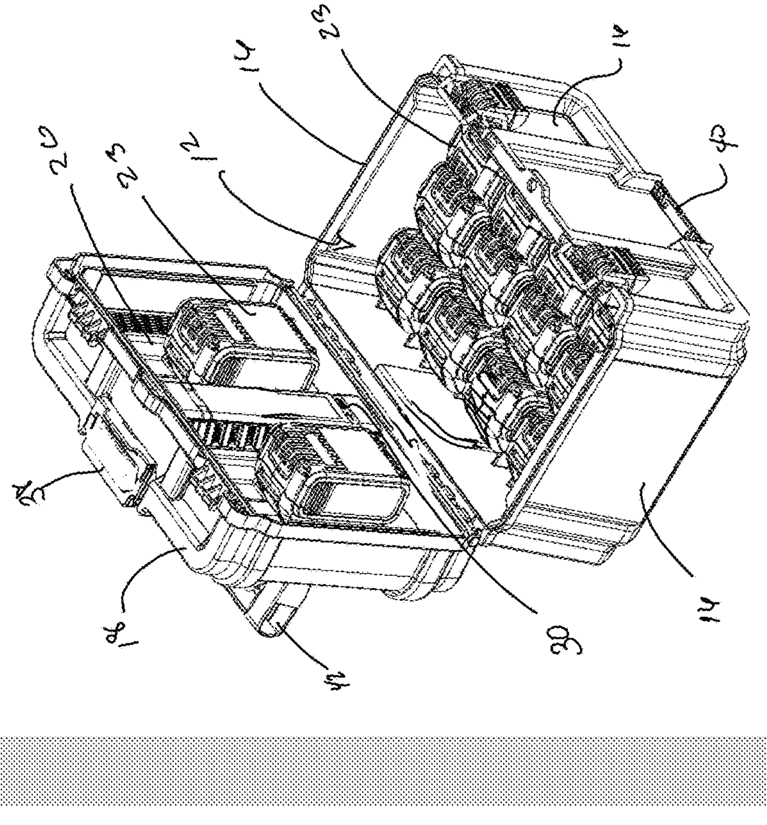
Figure 4:
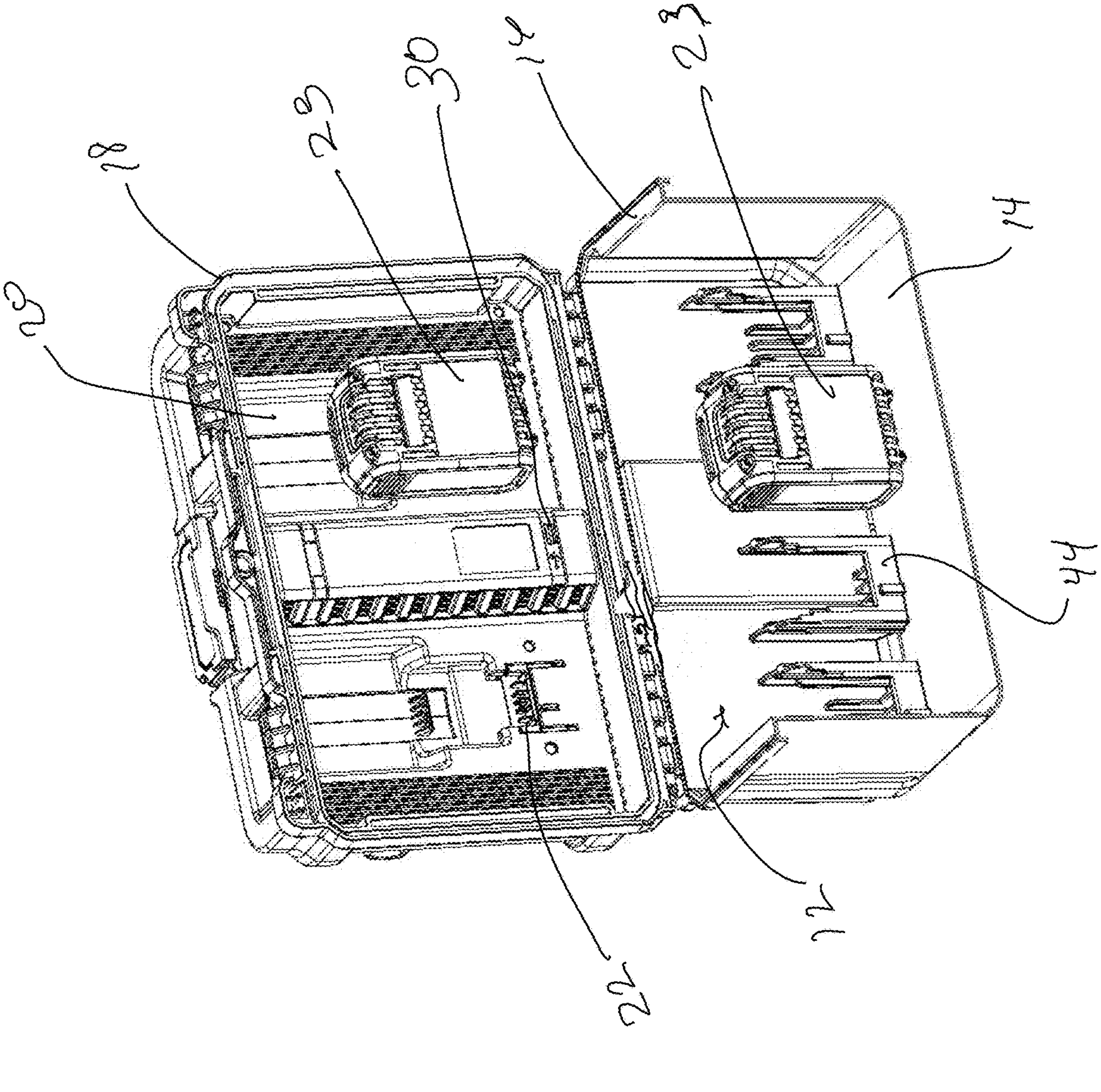
FIG. 4 is a cutaway view showing the interior of the container.

The cover member 18 has a first side 20, which when the cover member 18 is in its first position, is inaccessible from the outside of the container 10. The first side 20 of the cover member 18 includes at least one first electrical charging element 22. The first electrical charging element 22 is configured for charging tool batteries 23 electrically connected thereto. As shown in FIGS. 3*a*, 3*b* and 4, the first side 20 may include multiple first electrical charging elements 22.

The cover member 18 also includes a second side 24 that is remote from the first side 20. The second side 24 is accessible from outside the container 10 when the cover member 18 is in the first position. Further, the second side 24 includes visual indicia 26 for displaying the state of charge a tool battery 23 when it is electrically connected to the first electrical charging element 22. The visual indicia 26 may be achieved in a variety of different methods. However, it is preferable that the visual indicia 26 be some type of lighting scheme. For example, the lighting scheme could show a gauge that fills up with light in correspondence with the charging status of the tool battery 23. Alternatively, the visual indicia 26 could be a multi-colored scheme such as the familiar red, yellow, green scheme. In this embodiment, red could correspond to a relative low charge status of the tool battery. Yellow could correspond to a relatively mid-level charge. Finally, green could correspond to a relatively full charge. Those skilled in the art will recognize that any number of visual indicia 26 or lighting schemes could achieve the desired result. Said result is to give a visual indication of the relative status of the level of the charging battery 23.

In an alternative embodiment, the container 10 may also include an audible indicia (not shown) of the relative status of the level of the charging battery. Similar to the visual indicia, the audible indicia could be a microphone or speaker to provide a beep or a series of beeps to indicate to an operator that the battery 23 that is electrically connected to the first electrical charging element 22.

The container 10 may also include one or more latch mechanisms 28. When the cover member is in its first position, latch mechanism 28 selectively secures the cover member 18 to the side walls 16. As shown in FIG. 1, latch mechanism 28 may comprise a finger plate 29, a latch loop 31 and a latch lip 33. The finger plate may be pivotally secured to a side wall 16. The latch loop 31 may be pivotally attached to the finger plate 29. The latch loop 31 is configured to selectively engage the latch lip 33, which may be integral with the cover member 18. In operation, when the cover member 18 is in its first position, an operator may rotate the latch loop 31 so that it engages the latch lip 33. As this occurs, the finger plate 29 is rotated, wherein the end remote from the pivot is raised away from the surface of the side wall 16. In order to secure the latch mechanism 28, an operator need only apply pressure to the finger plate 29. By pressing the remote end of the finger plate 29 back toward the surface of the side wall 16, the latch mechanism 28 secures the cover member 18 in its first position. Those skilled in the art will recognize that any number of different latch mechanisms 28 can be employed to achieve the result of selectively securing the cover member 18 in its first position.

Figure 2:
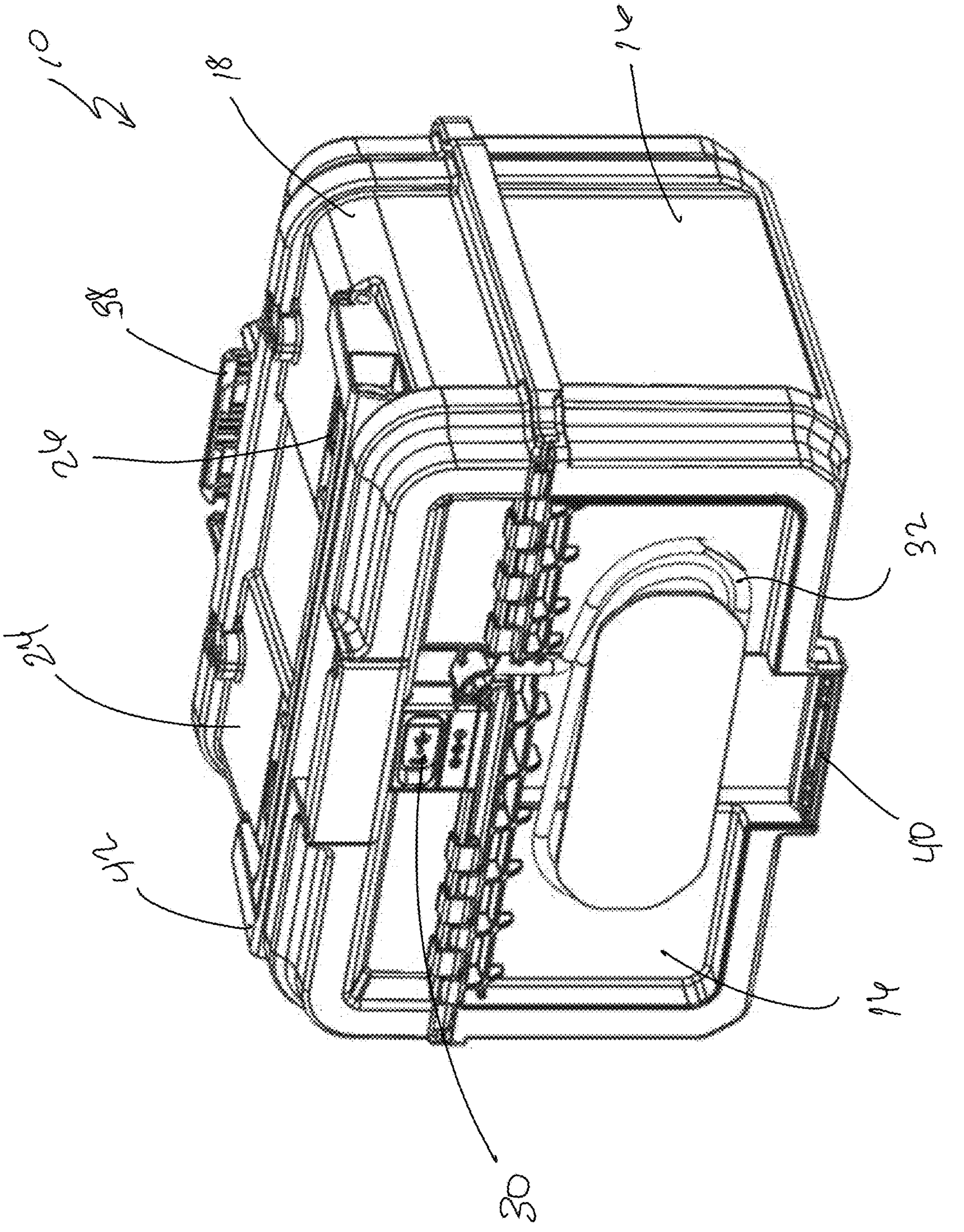
FIG. 2 is a rear perspective view of the closed container.
Figure 5:
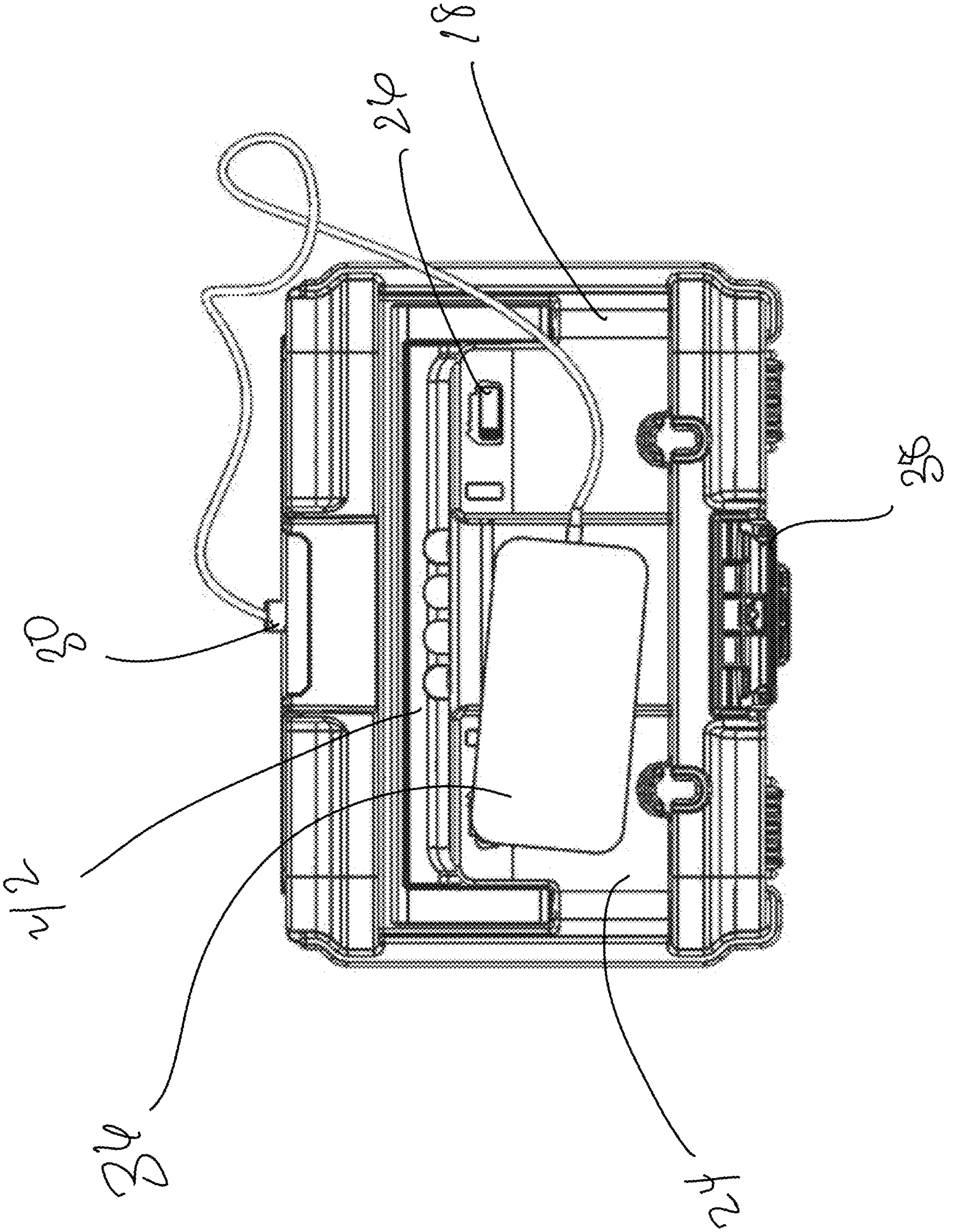
FIG. 5 is plan view of the closed container.

As shown in FIGS. 2 and 4, the container 10 may further include a second electrical charging element 30 that is configured to charge external handheld devices 36. The external handheld device 36 may be a mobile phone, music player, or gaming system that includes a rechargeable battery. The second electrical charging element 30 may be included on the exterior of the container 10 or it could be included on the first side 20 of the cover member 18, or both. The second electrical charging element 30 may also be wired or wireless. For example, as shown in FIG. 5, the second electrical charging element 30 is positioned on the outside of the container 10 and a wired charger, such as a USB or the like is connected to both the second electrical charging element 30 and the external handheld device 36. Alternatively, the present invention also contemplates the second electrical charging element 30 being wireless. In this embodiment (not shown), the second electrical charging element 30 is an electromagnetic induction charger, wherein the external handheld device 36 may be charged simply by placing the device on top of the container 10. As previously stated, the second electrical charging element 30 may be contained within the containment volume 12. More specifically, the second electrical charging element 30 may be included on the first side 20 of the cover member 18. In this embodiment, an operator may safely charge her handheld device 36, while the same is within the containment volume 12 and the cover member 18 is in the second position. Thus, the handheld device 36 may be charged while simultaneously being protected from theft. It should be noted that the visual and audio indicium 26, 27 may also be configured to provide respective information about the charge level of the handheld device 36 or any other item being charged by the second electrical charging element 30.

As best shown in FIG. 2, the container 10 may also include a power cord 32. The power cord 32 is configured to facilitate the flow of electrical energy from an outlet (fixed or mobile) to the first and second electrical charging elements 22, 30.

In yet another embodiment, the container may further include wireless communication means (not shown). The wireless communication means may be of any variety of types include Wi-Fi, Bluetooth, cellular or the like. Said wireless communication means, may be configured to transmit data regarding the relative charge status of either a battery 23 or handheld device 36 to a remote handheld device 36.

The container 10 may further include holders 44 that are configured to secure batteries 23 within the containment volume 12. Said holders 44 may be integral with the interior of the side walls 16, and may include one or more cantilevered edges 46 that are configured to engage corresponding ridges (not shown) on batteries 23. When engaging a battery 23 to a holder, it is preferable that the cantilevered edges 46 and corresponding ridges are configured for sliding engagement. As seen in FIGS. 3*a*, 3*b* and 4, the holders 44 may also be included on the first side 20 of the cover member 18. These holders 44 are positioned adjacent the first electrical charging element(s) 22 and are configured to hold a battery in place while it is being charged. Batteries held in place by the holders 44 will not "dance" within the containment volume 12 as the container is moved. "Dancing" is defined as the unwanted movement or rattling of batteries within the container 10.

The container 10 of the present invention may also be used in conjunction with an integrated multi-container transportation system, wherein each container is configured to be selectively stacked atop one another. In keeping with such a system, the container 10 may further include an automatic stacking latch 38 that is configured to secure the container 10 to another container within the transportation system. Similarly, the container 10 may also include one or more stacking lips 40. Stacking lips 40 are configured to receive/engage a stacking latch 38 and secure the container 10 to another container, wherein the two containers are in a stacked configuration. The container 10 may also include a carrying handle 42 that is configured to facilitate the transportation of the container 10.

It should be understood that although the invention has been described in conjunction with specific embodiments thereof, it is evident that many alternatives, modifications and variations will be apparent to those skilled in the art. Accordingly, it is intended to embrace all such alternatives, modifications and variations that fall within the scope of the claims.

What is claimed is:

1. A container comprising:
a base;
side walls, each of the side walls coupled to the base, the base and the side walls defining a containment volume;
a cover configured to be moveable between an open position in which the containment volume is accessible and a closed position in which the cover member, the side walls and the base form a closed container bounding the containment volume;
a first electrical charging element configured to charge a tool battery;
a holder on the cover member configured to hold the tool battery in place on the cover while the tool battery is being charged;
a latch configured to selectively secure the cover member in the closed position;
a stacking lip;
wherein the latch is at a front side of the container; and
wherein the stacking lip is at the front side of the container.

2. The container of claim 1, further comprising an automatic stacking latch configured to secure the container to another container.

3. The container of claim 2, wherein the stacking latch is at the front side of the container.

4. The container of claim 1, further comprising visual indicia configured to display a state of charge of the tool battery.

5. A container comprising:

a base;

side walls, each of the side walls coupled to the base, the base and the side walls defining a containment volume in which tool and batteries may be stored;

a cover member configured to be moveable between an open position in which the containment volume is accessible and a closed position in which the cover member, the side walls and the base form a closed container bounding the containment volume;

a first holder configured to hold a first tool battery in place adjacent to a first electrical charging element while the first tool battery is being charged by the first electrical charging element;

a second holder configured to hold a second tool battery in place adjacent to a second electrical charging element while the second tool battery is being charged by the second electrical charging element;

wherein the first holder is on the cover member; and wherein the second holder is on the cover member.

6. The charging container of claim 5, further comprising an automatic stacking latch configured to secure the container to another container.

* * * * *